United States Patent [19]

Ito et al.

[11] Patent Number: 5,398,501
[45] Date of Patent: Mar. 21, 1995

[54] AIR-FUEL RATIO CONTROL SYSTEM FOR INTERNAL COMBUSTION ENGINES

[75] Inventors: Hiroshi Ito; Yoichi Iwata; Takizawa Tsuyoshi; Toshihiko Sato; Naoki Iida; Takayoshi Nakayama, all of Wako, Japan

[73] Assignee: Honda Giken Kogyo K.K. (Honda Motor Co., Ltd. in English), Tokyo, Japan

[21] Appl. No.: 137,433

[22] Filed: Oct. 15, 1993

[30] Foreign Application Priority Data

Oct. 20, 1992 [JP] Japan .................................. 4-306395

[51] Int. Cl.$^6$ ............................................. F01N 3/20
[52] U.S. Cl. .......................................... 60/276; 60/277; 60/285; 123/703
[58] Field of Search .................... 60/276, 277, 285; 123/674, 703

[56] References Cited

U.S. PATENT DOCUMENTS

| | | | |
|---|---|---|---|
| 4,622,809 | 11/1986 | Abthoff | 60/274 |
| 4,729,220 | 3/1988 | Terasaka | 60/276 |
| 5,099,646 | 3/1992 | Nada | 60/277 |
| 5,154,054 | 10/1992 | Nakane | 50/277 |
| 5,154,055 | 10/1992 | Nakane | 60/276 |
| 5,172,549 | 12/1992 | Kako | 60/276 |
| 5,203,165 | 4/1993 | Wild | 60/277 |
| 5,209,060 | 5/1993 | Hirschmann | 60/277 |
| 5,267,472 | 12/1993 | Schneider | 60/277 |

*Primary Examiner*—Ira S. Lazarus
*Assistant Examiner*—Daniel J. O'Connor
*Attorney, Agent, or Firm*—Arthur L. Lessler

[57] ABSTRACT

An air-fuel ratio control system for an internal combustion engine having a catalytic converter arranged in the exhaust system, a first air-fuel ratio sensor arranged upstream of the catalytic converter, and a second air-fuel ratio sensor arranged downstream of the catalytic converter, calculates an air-fuel ratio control variable, based on an output from the second air-fuel ratio sensor. An air-fuel ratio correction amount is calculated based on an output from the first air-fuel ratio sensor and the air-fuel ratio control variable. The air-fuel ratio of a mixture supplied to the engine is controlled based on the air-fuel ratio correction amount. The air-fuel ratio control variable is corrected in the rich direction such that the air-fuel ratio of the mixture supplied to the engine becomes richer, when deterioration of the catalytic converter is detected.

5 Claims, 12 Drawing Sheets

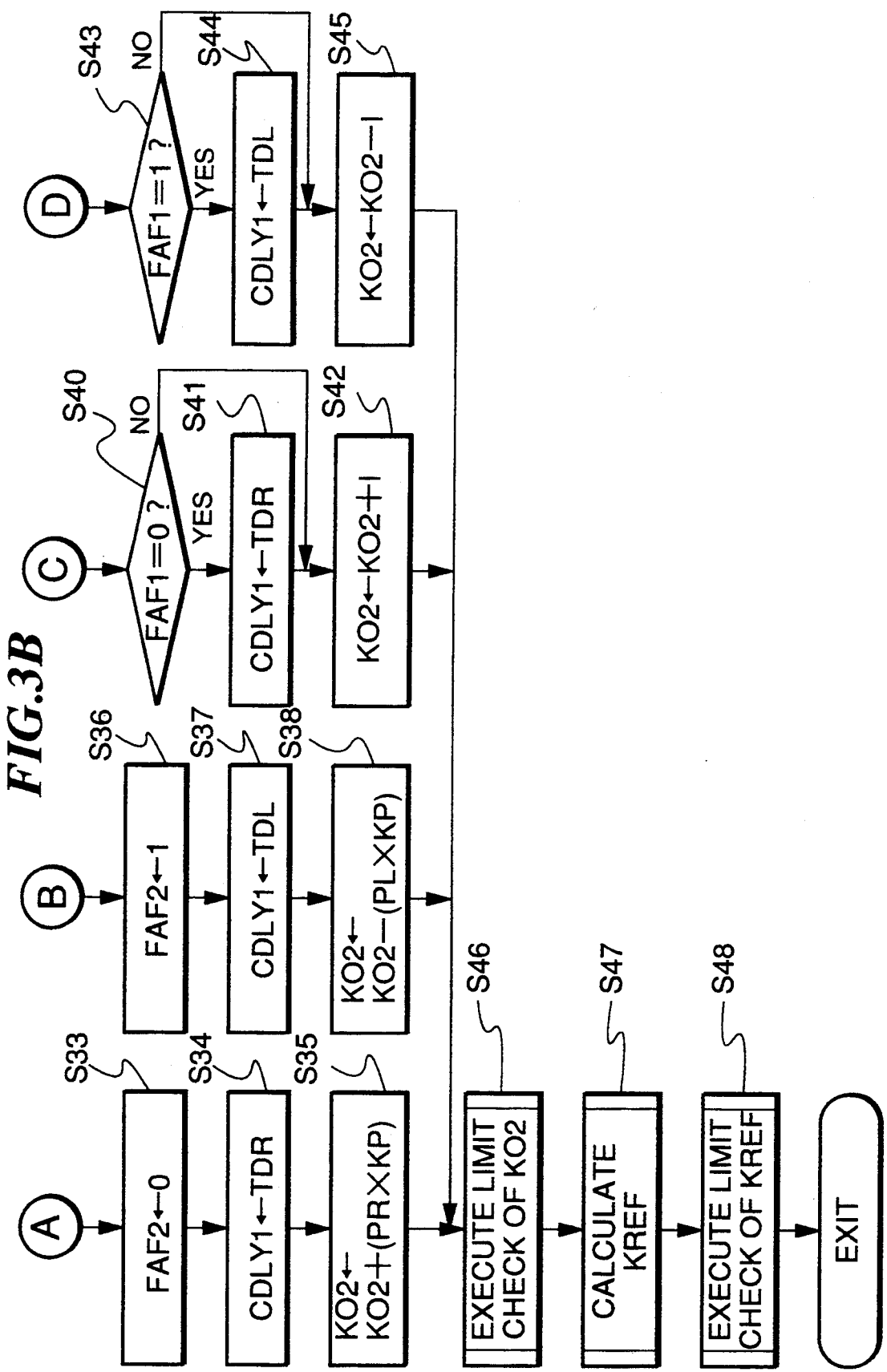

AIR-FUEL RATIO CONTROL SYSTEM FOR INTERNAL COMBUSTION ENGINES

BACKGROUND OF THE INVENTION

1. Field of the Invention

This invention relates to an air-fuel ratio-control system for an internal combustion engine having air-fuel ratio sensors provided at respective locations upstream and downstream of a catalytic converter arranged in the exhaust system of the engine, which control system controls the air-fuel ratio of an air-fuel mixture supplied to the engine, based on outputs from the air-fuel ratio sensors.

2. Prior Art

There is conventionally known a method of controlling the air-fuel ratio of an air-fuel mixture supplied to the engine, which method comprises providing air-fuel ratio sensors at respective locations upstream and downstream of a three-way catalyst arranged in the exhaust system of the engine, and carrying out feedback control of the air-fuel ratio of the mixture supplied to the engine (hereinafter referred to as "the supplied air-fuel ratio"), based on outputs from the air-fuel ratio sensors.

Further, an air-fuel ratio control system has been proposed, for example, by Japanese Provisional Patent Publication (Kokai) No. 63-147941, which carries out feedback control of the supplied air-fuel ratio, based on an output from an air-fuel ratio sensor arranged downstream of a catalytic converter arranged in the exhaust system of an internal combustion engine, and which can deal with deterioration of the catalytic converter by detecting a deterioration degree of the catalyst of the catalytic converter, and changing a skip amount (proportional term) and an integral term applied in the feedback control in response to the detected deterioration degree.

However, the above conventional control system is merely based on the fact that deterioration of the catalyst leads to a degradation in the O2 storage capacity of the catalytic converter, resulting in a shortened repetition period of change of the feedback control amount. Accordingly, the above control system which changes the skip amount and the integrated term merely in order to compensate for the shortened repetition period suffers from the following disadvantage:

That is, the deteriorated catalyst cannot completely purify unburnt gas components in the exhaust gases, so that some of the unburnt gas components (CO and HC) pass through the catalyst to the downstream side thereof and then to the downstream air-fuel ratio sensor. CO and HC as the unburnt gas components undergo a reaction with oxygen molecules from the atmosphere side which have passed through a zirconia layer of the air-fuel ratio sensor, at a platinum electrode of the catalyst. Due to the reaction, the downstream air-fuel ratio sensor outputs a signal indicative of a rich supplied air-fuel ratio even when residual oxygen molecules remain in the exhaust gases (the supplied air-fuel ratio is lean). As a result, the air-fuel ratio feedback-controlled based on the output from the downstream air-fuel ratio sensor deviates to a leaner value than a desired value thereof, thereby unfavorably increasing NOx emission.

SUMMARY OF THE INVENTION

It is an object of the invention to provide an air-fuel ratio control system for an internal combustion engine, which is capable of properly carrying out air-fuel ratio feedback control even when the catalyst is deteriorated, to thereby prevent the supplied air-fuel ratio from deviating to a leaner value than a desired value thereof.

To attain the above object, the present invention provides an air-fuel ratio control system for an internal combustion engine having an exhaust system, a catalytic converter arranged in the exhaust system, a first air-fuel ratio sensor arranged upstream of the catalytic converter, and a second air-fuel ratio sensor arranged downstream of the catalytic converter, comprising:

air-fuel ratio control variable-calculating means for calculating an air-fuel ratio control variable, based on an output from the second air-fuel ratio sensor;

air-fuel ratio correction amount-calculating means for calculating an air-fuel ratio correction amount, based on an output from the first air-fuel ratio sensor and the air-fuel ratio control variable;

air-fuel ratio control means for controlling an air-fuel ratio of a mixture supplied to the engine, based on the air-fuel ratio correction amount;

catalytic converter deterioration-detecting means for detecting deterioration of the catalytic converter; and enriching correction means for correcting the air-fuel ratio control variable in a rich direction such that the air-fuel ratio of the mixture supplied to the engine becomes richer, when deterioration of the catalytic converter is detected.

Preferably, the air-fuel ratio control variable-calculating means comprises updating means for updating a skip amount which stepwise changes the air-fuel ratio correction amount upon inversion of the output from the first air-fuel ratio sensor, by the use of a first updating amount when the output from the second air-fuel ratio sensor is on a richer side with respect to a predetermined reference value, and by the use of a second updating amount when the output from the second air-fuel ratio sensor is on a leaner side with respect to the predetermined reference value, the enriching correction means comprising updating amount-changing means for changing at least one the first and second updating amounts such that a ratio of the first updating amount to the second updating amount becomes smaller, when the deterioration of the catalytic converter is detected.

Also preferably, the air-fuel ratio correction amount includes a proportional control term, the air-fuel ratio control variable being for correcting the proportional control term.

To attain the same object, the present invention also provides an air-fuel ratio control system for an internal combustion engine having an exhaust system, a catalytic converter arranged in the exhaust system, a first air-fuel ratio sensor arranged upstream of the catalytic converter, and a second air-fuel ratio sensor arranged downstream of the catalytic converter, comprising:

air-fuel ratio control variable-calculating means for calculating an air-fuel ratio control variable, based on an output from the second air-fuel ratio sensor;

delay means for delaying timing of determination as to inversion of an output from the first air-fuel ratio sensor by a first predetermined period of time from a time a first inversion occurs in the output from the first air-fuel ratio sensor, the first inversion being in a direction of change of the output from the first air-fuel ratio sensor from a leaner side to a richer side, and for delaying the timing of determination as to inversion of the output from the first air-fuel ratio sensor by a second predetermined period of time from a time a second inversion occurs in the output from the first air-fuel ratio sensor, the second inversion being in a direction of change of the output from the first air-fuel ratio sensor from the richer side the leaner side;

air-fuel ratio correction amount-calculating means for calculating an air-fuel ratio correction amount, based on an output from the delay means and the air-fuel ratio control variable;

air-fuel ratio control means for controlling the air-fuel ratio of the mixture supplied to the engine, based on the air-fuel ratio correction amount;

catalytic converter deterioration-detecting means for detecting deterioration of the catalytic converter; and delay time-changing means for changing at least one of the first and second predetermined periods of time such that a ratio of the first predetermined period of time to the second predetermined period of time increases, when deterioration of the catalytic converter is detected.

Preferably, the air-fuel ratio correction amount includes a proportional control term, the air-fuel ratio control variable being for correcting the proportional control term.

The above and objects, features, and advantages of the invention will be more apparent from the following detailed description taken in conjunction with the accompanying drawings.

BRIEF DESCRIPTION OF THE DRAWINGS

FIG. 3B is a continued part of the flowchart of FIG. 3A;

DETAILED DESCRIPTION

The invention will now be described in detail with reference to the drawings showing embodiments thereof.

Figure 1:
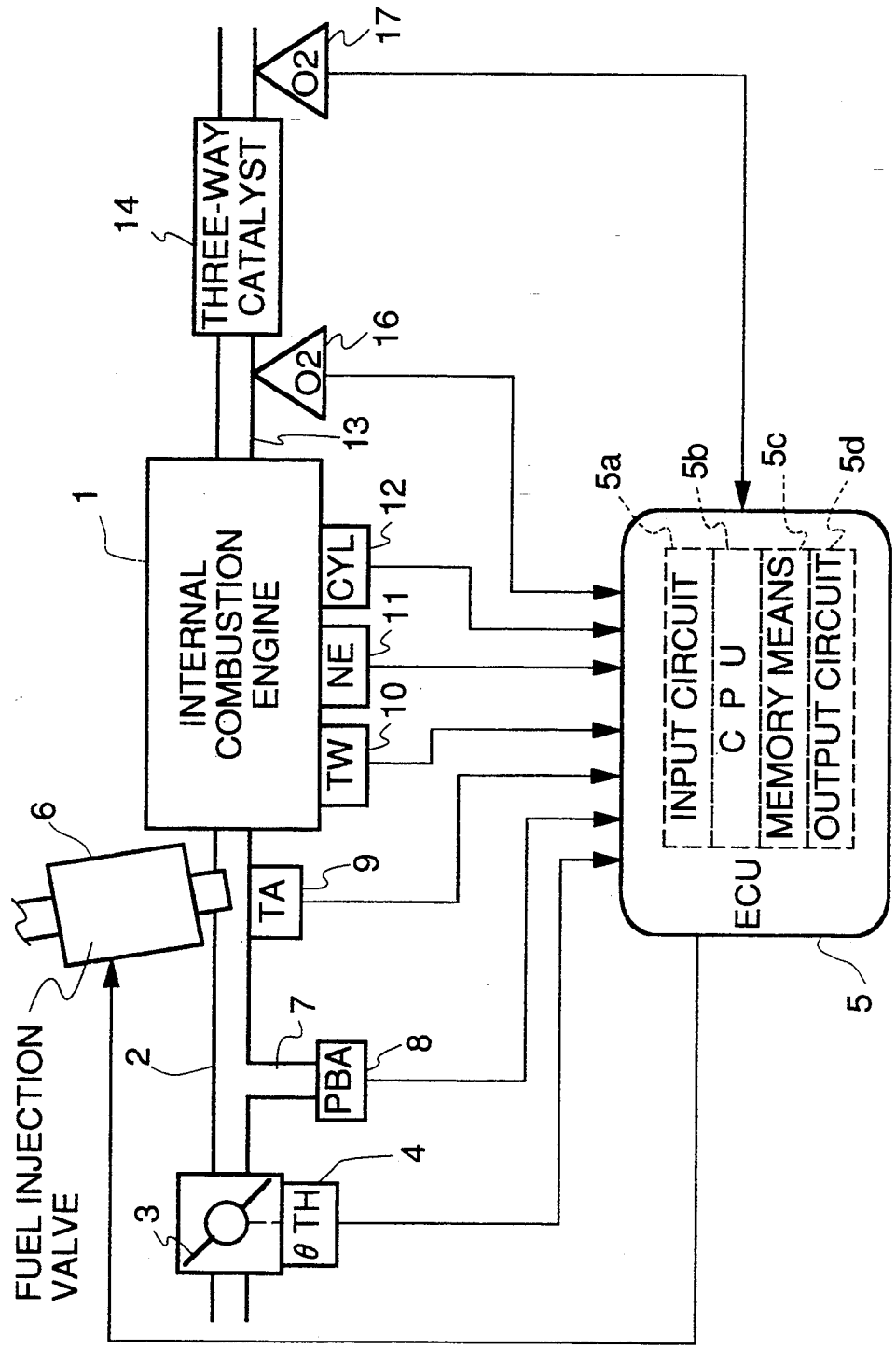
FIG. 1 is a block diagram showing the whole arrangement of an internal combustion engine and an air-fuel ratio control system therefor according to an embodiment of the invention.

Referring first to FIG. 1, there is shown the whole arrangement of an internal combustion engine and an air-fuel ratio control system therefor according to an embodiment of the invention. In the figure, reference numeral 1 designates an internal combustion engine. In an intake pipe 2 of the engine 1, there is arranged a throttle valve 3. The throttle valve 3 is connected to a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are each provided for each cylinder and arranged in the intake pipe 2 between the engine 1 and the throttle valve 3 at a location slightly upstream of an intake valve, not shown. Each fuel injection valve 6 is connected to a fuel pump, not shown, and electrically connected to the ECU 5 to have its valve opening period controlled by a signal therefrom.

On the other hand, an intake pipe absolute pressure (PBA) sensor 8 is provided in communication with the interior of the intake pipe 2 via a conduit 7 at a location immediately downstream of the throttle valve 3 for sensing absolute pressure (PBA) within the intake pipe 2, and is electrically connected to the ECU 5 for converting the sensed absolute pressure PBA into a corresponding electric signal and supplying the same to the ECU 5. Further, at a location downstream of the absolute pressure (PBA) sensor 8, an intake air temperature (TA) sensor 9 is inserted into the intake pipe 2 for supplying an electric signal indicative of the sensed intake air temperature TA to the ECU 5.

An engine coolant temperature (TW) sensor 10, which may be formed of a thermistor or the like, is mounted in a coolant-filled cylinder block of the engine for supplying an electric signal indicative of the sensed engine coolant temperature TW to the ECU 5. An engine rotational speed (NE) sensor 11 and a cylinder discriminating (CYL) sensor 12 are arranged in facing relation to a camshaft or a crankshaft to the engine 1, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A three-way catalyst (catalytic converter) 14 is arranged in an exhaust pipe 13 of the engine 1 for purifying components of HC, CO, NOx, and the like present in the exhaust gases. Arranged in the exhaust pipe 13 at respective locations upstream and downstream of the three-way catalyst 14 are oxygen concentration sensors 16 and 17 (hereinafter referred to as "the upstream O2 sensor 16" and "the downstream O2 sensor 17", respectively) for detecting concentration of oxygen present in the exhaust gases at the respective locations, and supplying signals indicative of the sensed oxygen concentration to the ECU 5.

The ECU 5 comprises an input circuit 5a having the functions of shaping the waveform of input signals from various sensors as mentioned above, shifting the voltage levels of sensor output signals to a predetermined level, converting analog signals from analog-output sensors to digital signals, and so forth, a central processing unit (hereinafter referred to as "the CPU") $5b$, memory means $5c$ storing various operational programs which are executed by the CPU $5b$, and for storing calculation results therefrom, etc. and an output circuit $5d$ which delivers driving signals to the fuel injection valves 6.

The CPU $5b$ operates in response to the above-mentioned signals from the sensors to determine operating conditions in which the engine 1 is operating, such as an air-fuel ratio feedback control region and open-loop control regions, and calculates, based upon the determined engine operating conditions, the valve opening period or a fuel injection period Tout over which the fuel injection valves 6 are to be opened in synchronism with generation of TDC signal pulses, by the use of the following equation (1):

$$Tout = Ti \times KO2 \times KLS \times K1 + K2 \quad (1)$$

where Ti represents a basic fuel amount, i.e. a basic value of the fuel injection period Tout, which is determined according to the engine rotational speed NE and the intake pipe absolute pressure PBA and read from a Ti map stored in the memory means $5c$.

KO2 represents an air-fuel ratio correction coefficient which is determined based on outputs from the upstream and downstream O2 sensors 16 and 17. The correction coefficient KO2 is set to a value such that the air-fuel ratio (oxygen concentration) detected by the upstream O2 sensor 16 becomes equal to a desired value when the engine 1 is operating in the air-fuel ratio feedback control region, while it is set to predetermined values corresponding to the respective operating regions of the engine when the engine 1 is in the open-loop control regions.

KLS represents an air-fuel ratio-leaning coefficient, which is set to a predetermined value smaller than 1.0 when the engine is in a predetermined decelerating condition, while it is set to a value of 1.0 when the engine is in conditions other than the decelerating condition.

K1 and K2 represent other correction coefficients and correction variables, respectively, which are set according to engine operating parameters to such values as optimize engine operating characteristics, such as fuel consumption and engine accelerability.

The CPU $5b$ supplies driving signals via the output circuit $5d$ to the fuel injection valves 6, based on the fuel injection period Tout thus calculated, to open the fuel injection valves 6.

Figure 2:
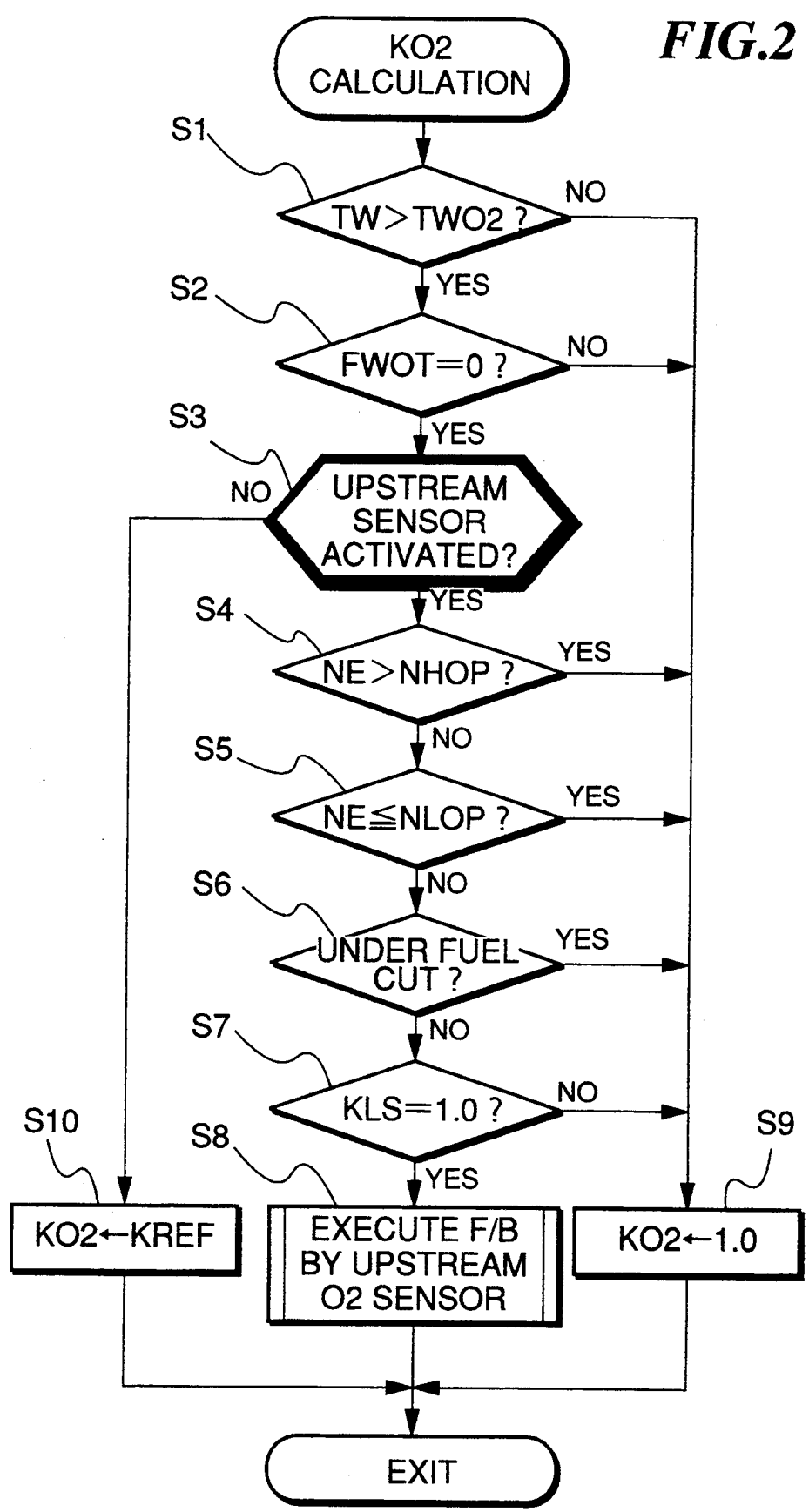
FIG. 2 is a flowchart showing a program for calculating an air-fuel ratio correction coefficient (KO2)

FIG. 2 shows a program for calculating the air-fuel ratio correction coefficient KO2, which is executed at predetermined fixed time intervals (e.g. 5 msec).

At steps S1 to S7, it is determined whether or not first feedback control-effecting conditions are satisfied, under which the feedback control based on the output from the upstream O2 sensor 16 can be executed. Specifically, it is determined whether or not an engine coolant temperature TW is higher than a first predetermined engine coolant temperature TWO2 (e.g. 25° C.) at the step S1, whether or not a flag FWOT which is set to a value of 1 when the engine is in a predetermined high load operating condition is equal to a value of 0 at the step S2, whether or not the upstream O2 sensor 16 is activated at the step S3, whether or not the engine rotational speed NE is higher than a predetermined higher engine rotational speed NHOP at the step S4, whether or not the engine rotational speed NE is equal to or smaller than a predetermined lower engine rotational speed NLOP at the step S5, whether or not the engine is under fuel cut at the step S6, and whether or not the air-fuel ratio-leaning coefficient KLS is equal to a value of 1.0 at the step S7. When the engine coolant temperature TW is higher than the predetermined engine coolant temperature TWO2, when FWOT=0, when the engine is not in the predetermined high load engine operating condition, when the upstream O2 sensor 16 is activated, when the engine rotational speed NE falls within a range of NLOP<NE≦NHOP, when the engine is not under fuel cut, when KLS=1.0, and when the engine is not in the predetermined decelerating condition, it is determined that the first feedback control-effecting conditions are satisfied, and then the program proceeds to a step S8, where the correction coefficient KO2 is calculated based on the output from the upstream O2 sensor 16.

Further, if both of TW>TWO2 and FWOT=0 are satisfied and at the same time the upstream O2 sensor 16 is inactivated, the program jumps over to a step S10, where the correction coefficient KO2 is set to a learned value KREF calculated during the feedback control at the step S8. If any one of the feedback control-effecting conditions is not satisfied, the program proceeds to a step S9, where the correction coefficient KO2 is set to a value of 1.0.

Figure 3A:
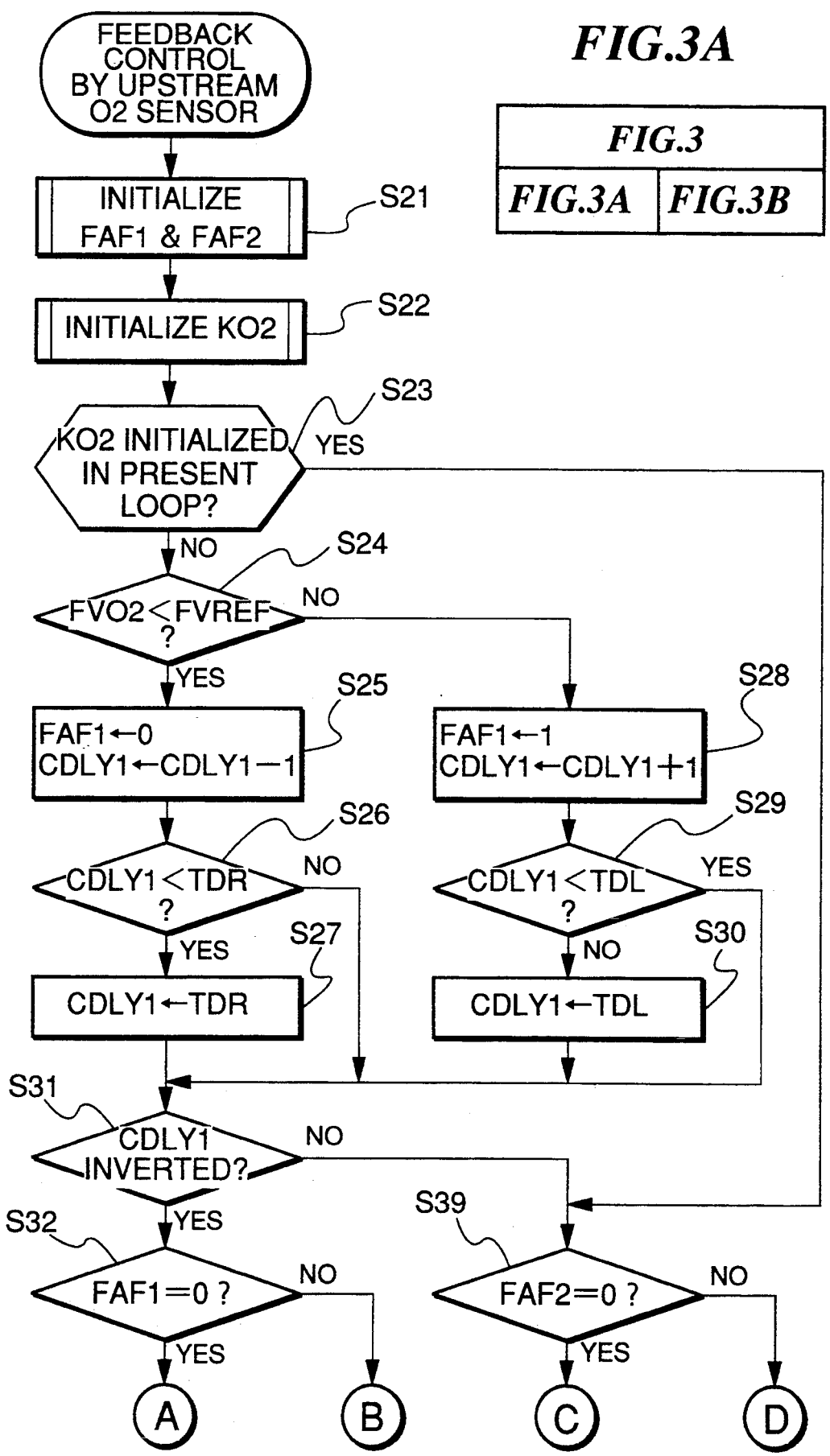
FIG. 3A is a flowchart showing a subroutine for calculating the air-fuel ratio correction coefficient KO2, based on an output from an O2 sensor arranged upstream of a catalytic converter.

FIGS. 3A and 3B show a subroutine executed at the step S8 of FIG. 2, where the correction coefficient KO2 is calculated in response to a voltage value FVO2 outputted from the upstream O2 sensor 16.

Figure 6:
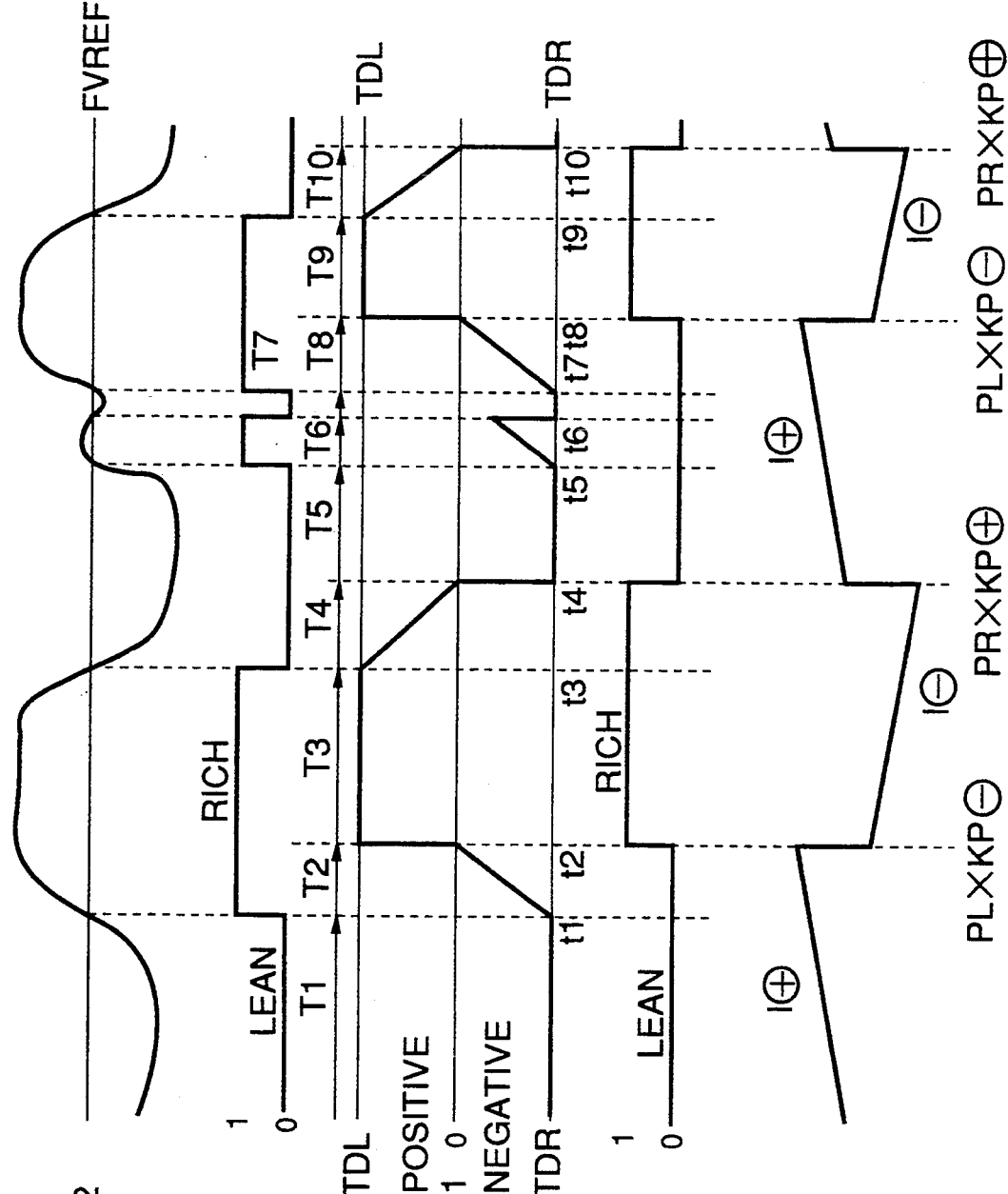
FIG. 6 is a timing chart useful in explaining the operation of the program of FIGS. 3A and 3B.

At a step S21, first and second lean/rich flags FAF1 and FAF2 are initialized. As shown in FIGS. 6(a) and 6(b), the first lean/rich flag FAF1 is set to a value of 1 when the output voltage value FVO2 from the upstream O2 sensor 16 is higher than a reference voltage FVREF (e.g. 0.45 V), that is, when the output voltage value FVO2 indicates a rich state of the supplied air-fuel ratio, and as shown in FIG. 6(d), the second lean/rich flag FAF2 is set to the same value as that of the flag FAF1 upon the lapse of a predetermined time period from a time point the first lean/rich flag FAF1 has been inverted, i.e. when the flag FAF1 has been changed from 0 to 1 or 1 to 0.

Figure 4:
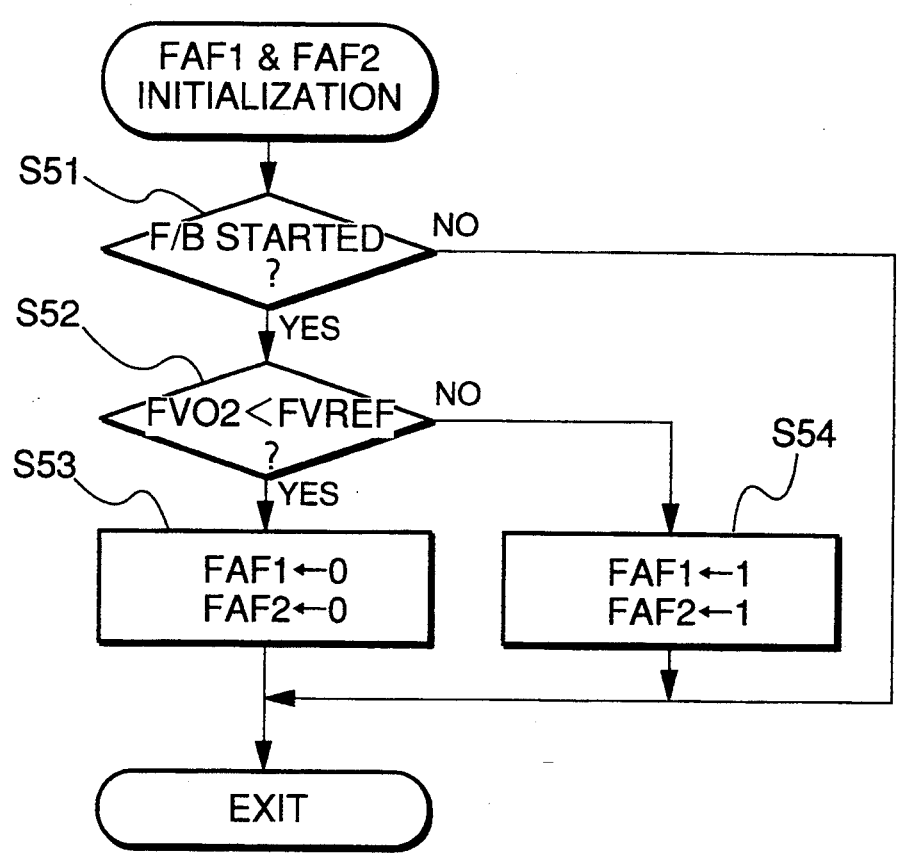
FIG. 4 is a flowchart showing a subroutine of the FIG. 3A program for initializing a flag used in steps of FIGS. 3A and 3B.

The initialization of these flags FAF1 and FAF2 is executed according to a subroutine shown in FIG. 4. Specifically, first, it is determined at a step S51 whether or not the present loop is immediately after the start of the feedback control, i.e. whether or not the open-loop control was executed in the last loop and the feedback control is to be started in the present loop. If it is determined that the present loop is not the first loop for execution of the feedback control, it is not required to initialize the flags FAF1 and FAF2, and therefore, the present program is immediately terminated.

If the present loop is the first loop for execution of the feedback control, it is determined at a step S52 whether or not the output voltage FVO2 from the upstream O2 sensor 16 is lower than the reference voltage FVREF. If FVO2<FVREF is satisfied, both of the first and second lean/rich flags FAF1 and FAF2 are set to a value of 0 at a step S53, whereas if FVO2≧FVREF, both of the flags are set to a value of 1 at a step S54.

Referring again to the FIG. 3A program, the KO2 value is initialized at a step S22. Specifically, if the present loop is immediately after the shift from the open loop control to the feedback control, or if the throttle valve 3 is suddenly opened during the feedback control mode, the learned value KREF to be calculated at a step S47, described hereinafter, is applied as an initial value of the KO2 value. If the present loop is in a condition other than the above conditions, no initialization of the KO2 value is executed at the step S22.

At the following step S23, it is determined whether or not the KO2 value has been initialized in the present loop. If it is determined that the KO2 value has been initialized, the program jumps over to a step S39, whereas if the initialization has not been executed, the program proceeds to a step S24.

When the feedback control is being started, the answer to the question of the step S23 is affirmative (YES), and hence at steps S39 to S45 an initial value of a P term-generating delay counter CDLY1 is set and integral control (I term control) of the KO2 value is executed in response to the values of the lean/rich flags FAF1 and FAF2. As shown in FIGS. 6(b), 6(c) and 6(d), the counter CDLY1 measures a delay time from a time point the first lean/rich flag FAF1 is inverted to a time point the second lean/rich flag FAF2 is inverted, i.e. a time period from a time point the O2 sensor output FVO2 is inverted to a time point the proportional control (P term control) is executed.

At the step S39, it is determined whether or not the second lean/rich flag FAF2 is set to a value of 0. If FAF2=0, the program proceeds to the step S40 of FIG. 3B, where it is determined whether or not the first lean/rich flag FAF1 is set to a value of 0. On the other hand, if FASF2=1, the program proceeds to the step S43 of FIG. 3B, where it is determined whether or not the first lean/rich flag FAF1 is set to a value of 1. When the feedback control is being started, if FVO2<FVREF, both of the flags FAF1 and FAF2 are set to 0 (see FIG. 4), and therefore, the program proceeds via the steps S39 and S40 to the step S41, where the counter CDLY1 is set to a predetermined negative value TDR (e.g. approx. 120 msec). If FVO2≧FVREF, both of the flags FAF1 and FAF2 are set to 1, and therefore, the program proceeds via the steps S39 and S43 to the step S44, where the counter CDLY1 is set to a predetermined positive value TDL (e.g. approx. 40 msec). If both of the flags FAF1 and FAF2 are not equal to a value of 0 or 1, the counter CDLY1 is not initialized. If FAF2=0, a predetermined value I is added to the KO2 value at the step S42, whereas if FAF2 =1, the predetermined value I is subtracted from the KO2 value at the step S45, followed by program proceeding to a step S46.

If the answer to the question of the step S23 of FIG. 3A is negative (NO), i.e. if the KO2 value has not been initialized in the present loop, the program proceeds to a step S24, where it is determined whether or not the upstream O2 sensor output voltage FVO2 is lower than the reference voltage FVREF. If FVO2 FVREF, the program proceeds to a step S25, where the first lean/rich flag FAF1 is set to a value of 0 and the P-term generating delay counter CDLY1 is decremented by a value of 1 (see T4 and T10 of FIG. 6(c)). Then, it is determined at a step S26 whether or not the count value of the counter CDLY1 is smaller than the predetermined negative value TDR. If CDLY1<TDR, the counter CDLY1 is set to the value TDR at a step S27, whereas if CDLY≧TDR, the program immediately proceeds to a step S31.

If the answer to the question of the step S24 is negative (NO), i.e. if FVO2≧FVREF, the first lean/rich flag FAF1 is set to 1, and the counter CDLY1 is incremented by 1 (see T2, T6 and T8 of FIG. 6(c)). Then, it is determined at a step S29 whether or not the count value of the counter CDLY1 is smaller than the predetermined positive value TDL. If CDLY1≧TDL, the counter CDLY1 is set to the value TDL at a step S30, whereas if CDLY1<TDL, the program immediately proceeds to the step S31.

In this way, the steps S26, S27, S29 and S30 function so that the count value of the counter CDLY1 does not become smaller than the predetermined negative value TDR nor larger than the predetermined positive value TDL.

At the step S31, it is determined whether or not the sign (plus or minus sign) of the count value of the counter CDLY1 has been inverted. If the sign has not been inverted, the I term control is executed at the steps S39 to S45, whereas if the sign has been inverted, the P term control is executed at steps S32 to S38.

At the step S32, it is determined whether or not the first lean/rich flag FAF1 is equal to a value of 0. If FAF1=0, the program proceeds to the step S33 of FIG. 3B, where the second lean/rich flag FAF2 is set to a value of 0, and then the count value of the counter CDLY1 is set to the predetermined negative value TDR at the step S34. Further, the correction coefficient KO2 is calculated at the step S35 by the use of the following equation (2) (see time points t4 and t10 of FIG. 6):

$$KO2 = KO2 + PR \times KP \qquad (2)$$

where PR represents an enriching proportional term (P term) and KP represents a P term correction coefficient. The PR value is calculated according to a program of FIG. 5, described hereinafter, and the KP value is read from a map, not shown, which is set in accordance with the engine rotational speed NE and the intake pipe absolute pressure PBA.

If the answer to the question of the step S32 is negative (NO), i.e. if FAF1=1, the second lean/rich flag FAF2 is set to 1 at the step S36, and the count value of the counter CDLY1 is set to the predetermined positive value TDL at the step S37. Further, the correction coefficient KO2 is calculated at the step S38 by the use of the following equation (3) (see time points t2 and t8 of FIG. 6).

$$KO2 = KO2 - PL \times KP \qquad (3)$$

where PL represents a leaning proportional term (P term). The PL value is calculated by the program of FIG. 5 in the same manner as in the calculation of the PR value.

After the KO2 value is thus calculated at the step S35, S38, S42 or S45, at a step S46, limit check of the KO2 value is carried out, and the learned value KREF of the KO2 is calculated at the step S47. Further, limit check of the KREF value is carried out at a step S48, followed by terminating the present program.

According to the program of FIGS. 3A and 3B described above, as shown in FIG. 6, the P term control is executed (time points t2, t4, t8 and t10) after a predetermined delay time (T2, T4, T8 and T10) from a time point the upstream O2 sensor output voltage FVO2 has been inverted (time points t1, t3, t7 and t9). For a time period over which the second lean/rich flag FAF2 is equal to 0, the I term control for increasing the KO2 value is executed (T1, T2 and T5 to T8), whereas for a time period over which the flag FAF2 is equal to 1, the I term control for decreasing the KO2 value is executed (T3, T4, T9 and T10). Incidentally, the O2 sensor output FVO2 varies with a short repetition period over a time period from the time point t5 to the time point t7, however, the period of variation in the sensor output FVO2 is shorter than the delay time of the P term control corresponding to the predetermined negative value TDR, and therefore, the second lean/rich flag FAF2 is not inverted, resulting in no execution of the P term control over the above time period.

Figure 5:
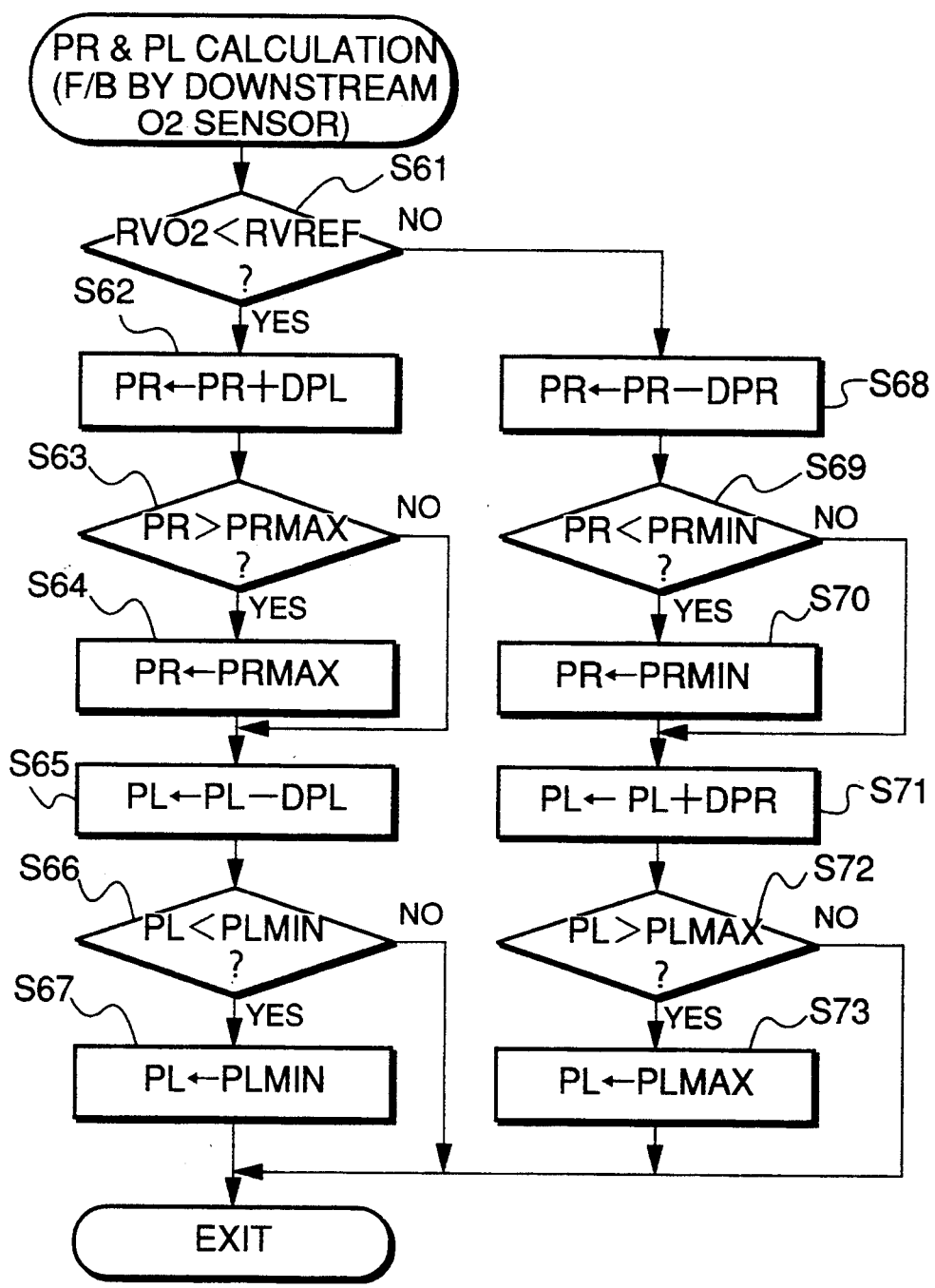
FIG. 5 is a flowchart showing a program for calculating parameter values PR and PL, based on the output from the O2 sensor downstream of the catalytic converter.

FIG. 5 shows a program for calculating the enriching P term PR and the leaning P term PL used in the FIGS. 3A and 3B program. The present program is executed at predetermined fixed time intervals (e.g. 100 msec).

The PR value and the PL value are basically calculated based on an output voltage value RVO2 from the downstream O2 sensor 17 (second feedback control). However, when the second feedback control cannot be executed (e.g. during idling of the engine, when the downstream O2 sensor 17 is inactive, etc.), a predetermined value or the learned value calculated during the feedback control is applied as the PR and PL values.

Figure 7:
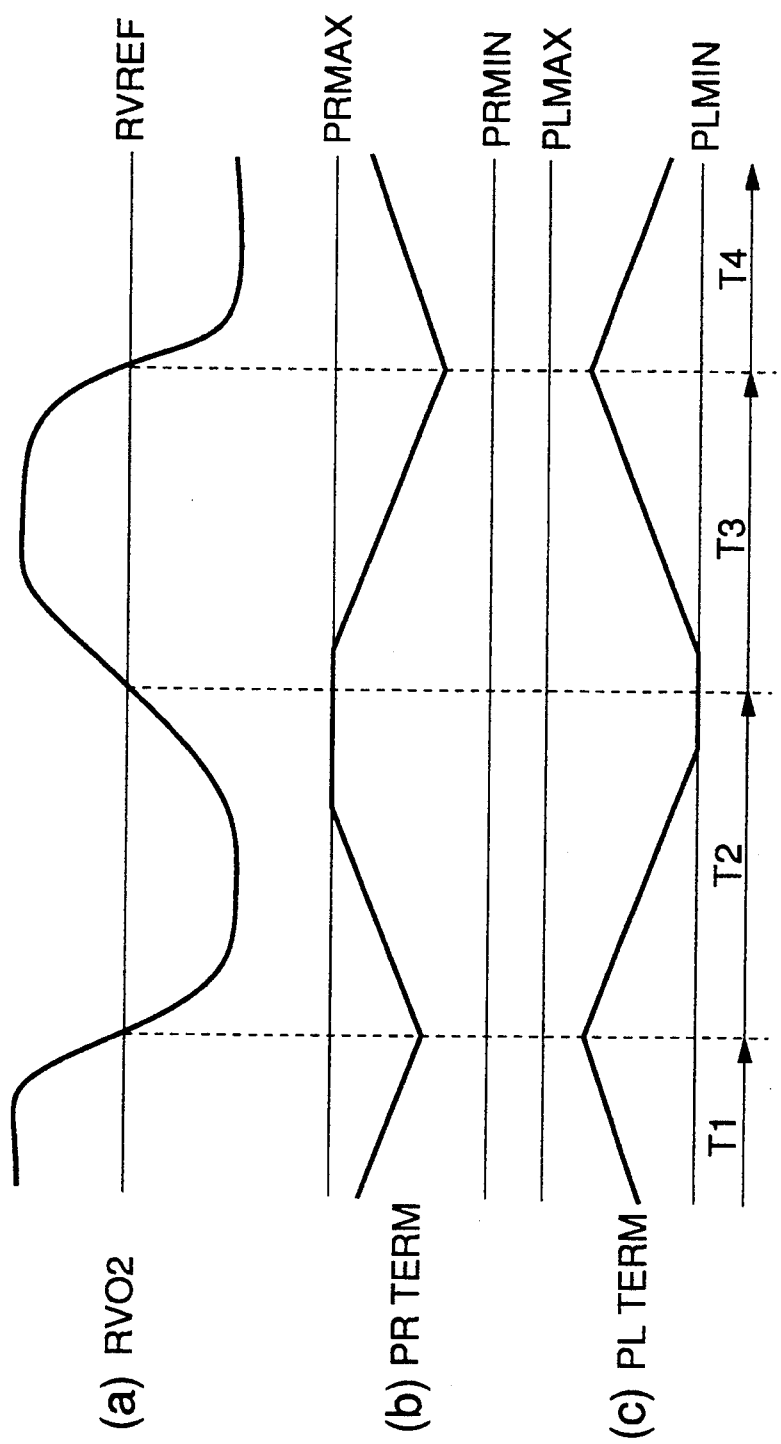
FIG. 7 is a timing chart useful in explaining the operation of the program of FIG. 5.

At a step S61, it is determined whether or not the downstream O2 sensor output voltage RVO2 is lower than a reference value RVREF (e.g. 0.45 V). If RVO2<RVREF, the program proceeds to a step S62, where a leaning-determining correction term DPL is added to the PR value (see T2 and T4 of FIG. 7(b)). When the PR I value exceeds an upper limit value PRMAX at a step S63, the PR value is set to the upper limit value PRMAX at a step S64.

At the next step S65, the leaning-determining correction term DPL is subtracted from the PL value (see T2 and T4 of FIG. 7(c)). If the PL value is smaller than a lower limit value PLMIN at a step S66, the PL value is set to the lower limit value PLMIN at a step S67.

On the other hand, if the answer to the question of the step S61 is negative (NO), i.e. if RVO2≧RVREF, the program proceeds to a step S68, where an enrichment-determining correction term DPR is subtracted from the PR value (see T1 and T3 of FIG. 7(b)). If it is determined at a step S69 that the PR value after the subtraction is smaller than a lower limit value PRMIN, the PR value is set to the lower limit value PRMIN at a step S70.

Then, at a step S71, the enrichment-determining correction term DPR is added to the PL value (see T1 and T3 of FIG. 7(c)). If it is determined at a step S72 that the PL value after the addition is larger than an upper limit value PLMAX, the PL value is set to the upper limit value PLMAX at a step S73.

According to the program of FIG. 5 described above, as shown in FIG. 7, for a time period over which RVO2<RVREF holds (T2 and T4), the PR value is increased within a range between the lower and upper limit values PRMIN and PRMAX, while the PL value is decreased within a range between the lower limit value and the upper limit value PLMIN and PLMAX. On the other hand, for a time period over which RVO2≧RVREF (T1 and T3)P, the PR value is decreased, and the PL value is increased within the above-mentioned respective ranges.

Figure 8:
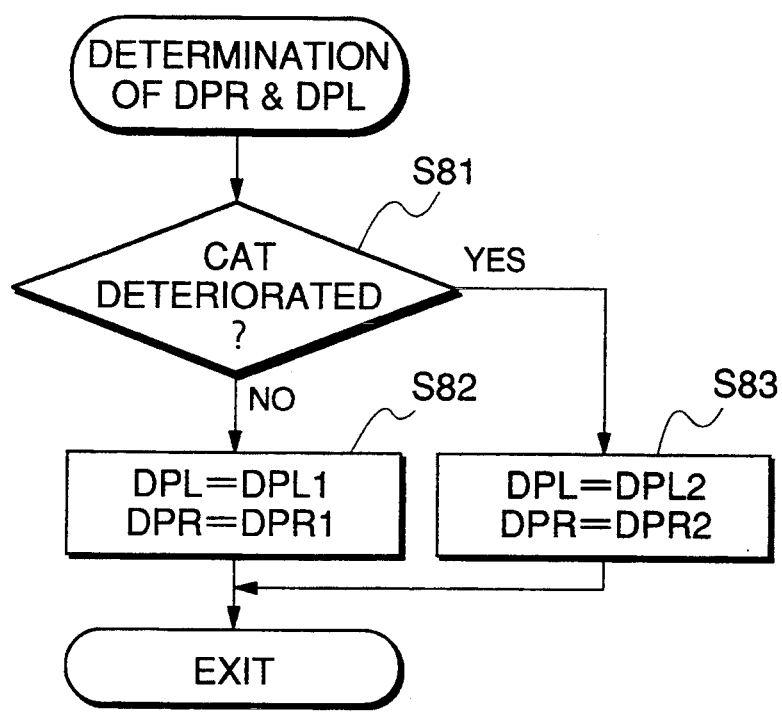
FIG. 8 is a flowchart showing a program for calculating parameter values DPL and DPR used in the program of FIG. 5.

Next, how the correction terms DPR and DPL (first and second updating amounts) are determined in a manner depending upon whether or not deterioration of the performance of the three-way catalyst 14 occurs will be described with reference to FIG. 8.

As shown in the figure, when no deterioration of the catalyst (CAT) performance is detected at a step S81 by a method, described hereinafter, the DPR value and the DPL value are set to respective predetermined values DPR1 and DPL1 for normal catalyst performance (e.g. 1 and 3), at a step S82. On the other hand, when deterioration of the catalyst performance is detected at the step S81, the DPR value and the DPL value are set to respective predetermined values DPR2 and DPL2 for deteriorated catalyst performance (e.g. 1 and 4), at a step S83.

Thus, the updating rate of the PR term and the PL term (skip amount) is increased so that (the inclinations of FIGS. 7(b) and 7(c) over T2 and T4 become sharp, at the leaning determination of the RVO2 (i.e. when RVO2<RVREF), thereby increasing the value of the PR term relative to the value thereof for normal catalyst, while decreasing the value of the PL term relative to the value for normal catalyst. As a result, the supplied air-fuel ratio obtained by the air-fuel ratio feedback control based on the output FVO2 from the upstream O2 sensor is biased in the rich direction. In this way, it is possible to prevent deviation of the output from the downstream O2 sensor in the lean direction (which deviation is caused by the reaction of unburnt gas components from the catalyst with oxygen ions supplied from the sensor in the vicinity of a platinum electrode thereof), to thereby cause deviation of the supplied air-fuel ratio in the lean direction when the catalyst is deteriorated, by biasing the supplied air-fuel ratio in the rich direction as described above.

In the above described embodiment, only the leaning-determining correction term DPL is corrected to an increased value. However, alternatively only the enrichment-determining correction term DPR may be corrected to a decreased value, or both of an increase in the DPL value and a decrease in the DPR value may be effected. That is, when the catalyst performance is deteriorated, the DPR value and/or the DPL value are changed so that a value DPR/DPL (the ratio of DPR to DPL) should be smaller than a value assumed when the catalyst has normal performance.

Figure 9:
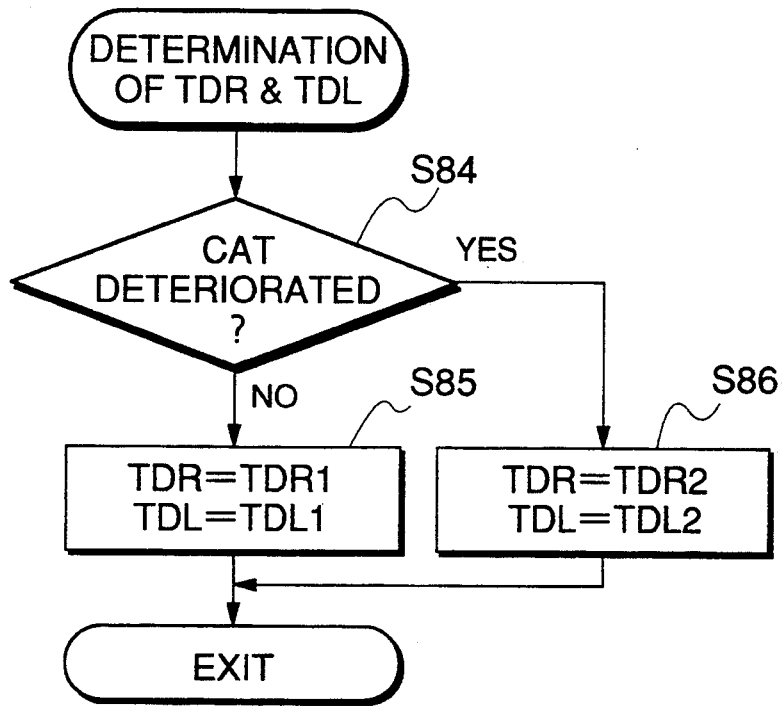
FIG. 9 is a flowchart showing a program for calculating parameter values TDL and TDR used in the program of FIGS. 3A and 3B.

FIG. 9 shows another embodiment in which, in place of changing the correction terms DPR and DPL, the predetermined values TDR and TDL (first and second predetermined time periods) are changed. These predetermined values TDR and TDL determine delay times from the inversion of the first lean/rich flag FAF1 to the inversion of the second lean/rich flag FAF2.

As shown in the figure, when no deterioration of the catalyst performance is detected at a step S84, the TDR and TDL values are set to respective predetermined values TDR1 and TDL1 for normal catalyst (e.g. values corresponding, respectively, to 120 msec and 40 msec) at a step S85. However, when deterioration of the catalyst performance is detected at the step S84, the TDR and TDL values are set to respective predetermined values TDR2 and TDL2 for deteriorated catalyst (e.g. values corresponding, respectively, to 60 msec and 10 msec) at a step S86.

By setting the TDR and TDL values as mentioned above, when the catalyst is deteriorated, the ratio of a delay time after inversion of the upstream O2 sensor output FVO2 from the lean side to the rich side (T2 and T8 of FIG. 6(b)) to a delay time after inversion of the upstream O2 sensor in an opposite direction (T4 and T10 of FIG. 6(b)) becomes larger than the same ratio obtained when the catalyst has normal performance.

For example, when the catalyst normally acts, $|TDR1|/TDL1=3$ is satisfied, whereas when the catalyst is deteriorated, $|TDR2|/TDL2=6$ is obtained. Therefore, the time period over which the integral control is effected in the direction of addition of the I term (T1 +T2 and T5+T6+T7+T8 of FIG. 6(b)) becomes relatively longer, resulting in that the supplied air-fuel ratio is biased in the rich direction. Therefore, according to the present embodiment as well, even when the catalyst is deteriorated, the supplied air-fuel ratio can be prevented from deviating in the lean direction.

In the embodiment of FIG. 9, both of the TDR and TDL values are changed. However, alternatively only the |TDR| value may be increased, or only the TDL value may be decreased. That is, the TDR value and/or the TDL value may be changed so as to make larger the value |TDR|/TDL (the ratio of |TDR| to TDL) than that obtained in the case of normal catalyst.

Next, how deterioration of the performance of the three-way catalyst 14 is determined will be described with reference to FIGS. 10 to 12. As shown in FIG. 11, during execution of the feedback control in which the correction coefficient KO2 is calculated based only on the output RVO2 from the downstream O2 sensor 17, a time period TL from a time point a special P term PLSP for skipping the KO2 value in the decreasing direction is generated to a time point the O2 sensor output RVO2 is inverted, and a time period TR from a time point a special P term PRSP for skipping the KO2 value in the increasing direction is generated to a time point the O2 sensor output RVO2 is inverted, are calculated. The determination of deterioration of the catalyst performance is carried out based on the thus obtained time periods TL and TR.

Figure 10:
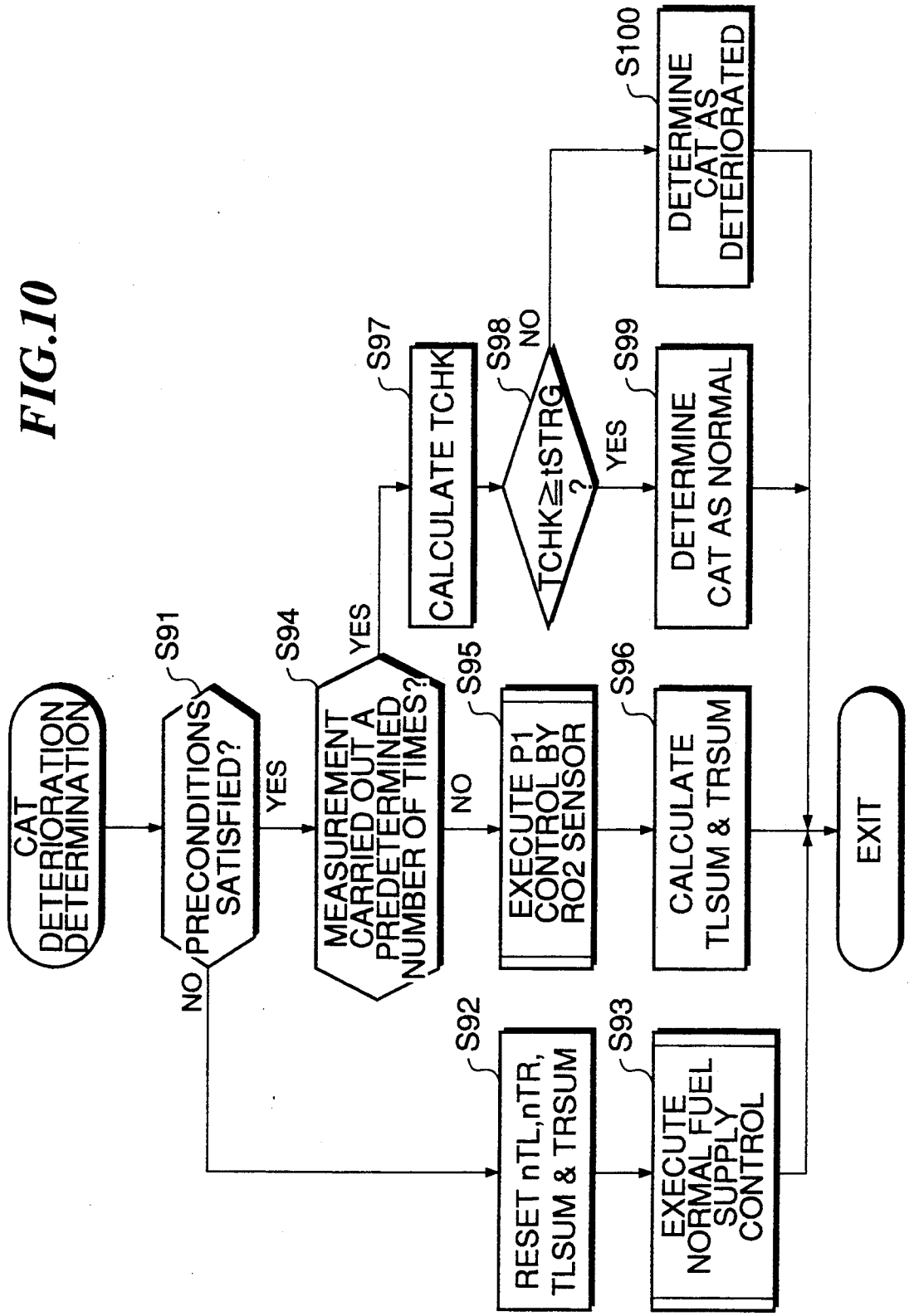
FIG. 10 is a flowchart showing a program for carrying out determination of deterioration of the catalytic converter.
Figure 11:
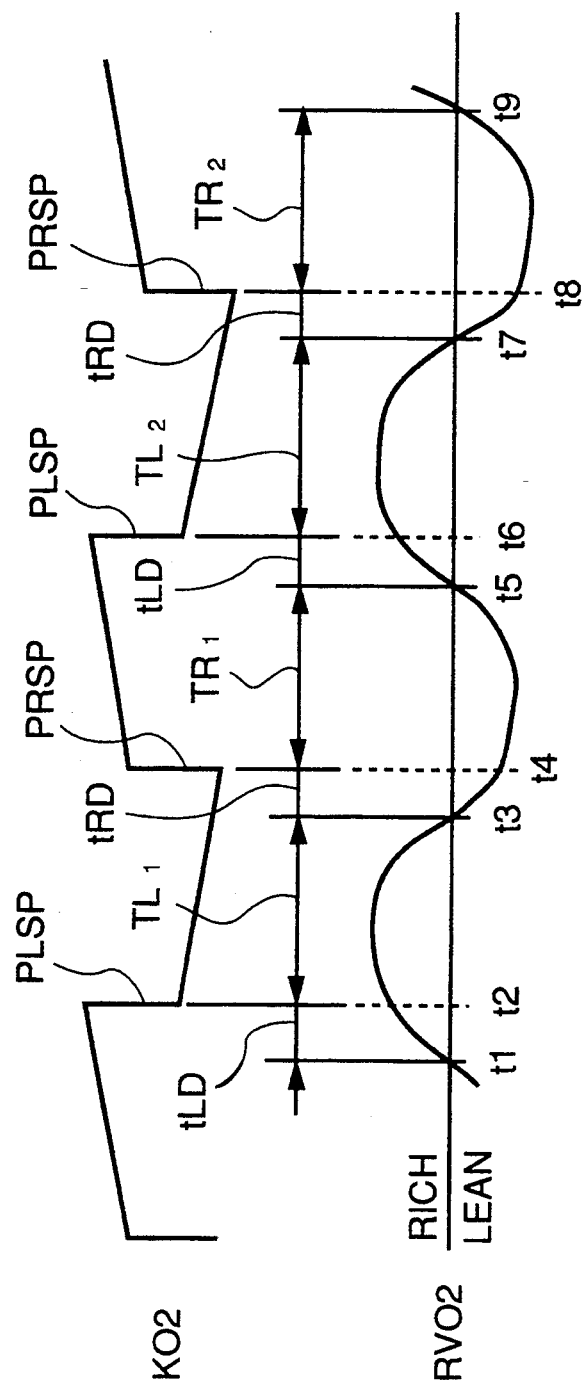
FIG. 11 is a timing chart useful in explaining the operation of the program of FIG. 10.

FIG. 10 shows a program for executing the above deterioration determination. At a step S91 of the figure, it is determined whether or not preconditions for the deterioration determination-are satisfied. The preconditions are satisfied when the engine is operating in a steady condition.

If the preconditions are not satisfied, respective integral values TLSUM and TRSUM of the time periods TL and TR and respective numbers of-times of measurement nTL and nTR of the time periods TL and TR are all reset to 0 at a step S92, and the normal fuel supply control according to the programs of FIGS. 3A, 3B to 5 is executed at a step S93.

If the preconditions are satisfied, it is determined at a step S94 whether or not the measurements of the TL and TR values have been carried out a predetermined number of times. In the first loop of execution of the program, the answer to the question at the step S94 becomes negative (NO), and therefore the program proceeds to a step S95, where the PI (proportional integral) control based only on the downstream O2 sensor output RVO2 is executed, and the TL and TR values are measured. Then, the integral values TLSUM and TRSUM thereof are calculated at a step S96.

Specifically, as shown in FIG. 11, at a time point t2 a predetermined time period tLD has elapsed after a time point t1 a lean-to rich inversion of the O2 sensor output RVO2 occurred, the KO2 value is skipped in the decreasing direction using the special P term PLSP, and then the I term control is executed by gradually decreasing the KO2 value until a time point t4 when a predetermined time period tRD elapses after a time point t3 when a rich-to-lean inversion of the sensor output RVO2 occurs. The time period from the time point t2 to the time point t3 is measured as a TL value ($TL_1$). Next, at the time point t4, the KO2 value is skipped in the increasing direction by the use of the special P term PRSP in the rich direction, and then the I term control is executed by gradually increasing the KO2 value until a time point t6 when a predetermined time period tLD elapses after a time point t5 when a lean-to-rich inversion of the sensor output RVO2 occurs. The time period from the time point t4 to the time point t5 is measured as a TR value ($TR_1$). Thereafter, $TL_2$, $TR_2$, . . . are successively measured in the same manner as above, followed by calculating integral values TLSUM and TRSUM of the measured TL and TR values.

If the answer to the question of the step S94 is affirmative (YES), i.e. if the measurement has been carried out the predetermined number of times, a determination time period TCHK is calculated by the use of the following equation (4) at a step S97:

$$TCHK = (TLSUM/nTL + TRSUM/nTR)/2 \qquad (4)$$

Then, it is determined whether or not the determination time period TCHK is equal to or larger than a predetermined value tSTRG at a step S98. If the TCHK is equal to or larger than the predetermined value tSTRG, it is determined at a step S99 that the catalyst is in a normal state, whereas if it is smaller than the predetermined value tSTRG, it is determined at a step S100 that the catalyst is deteriorated.

Figure 12:
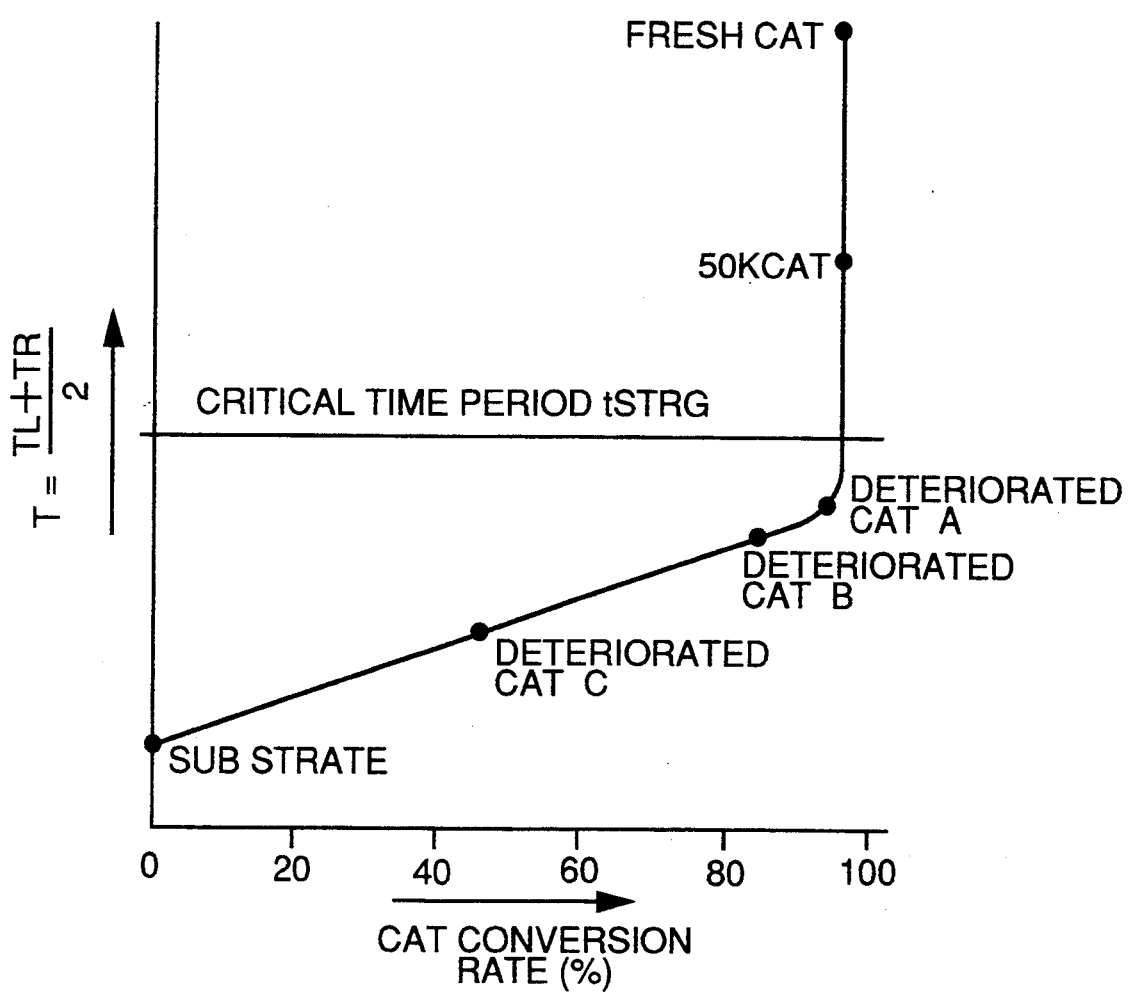
FIG. 12 is a graph useful in explaining a manner of determination of deterioration of the catalytic converter.

This deterioration determination is based on the fact that an average value T of the time periods TL and TR and the purification rate of the catalyst (CAT conversion rate) are in the relationship as shown in FIG. 12. As shown in the figure, the average value T decreases as the performance of the catalyst (O2 storage capacity) is deteriorated. By utilizing this relationship, the deterioration of the catalyst can be accurately determined.

As is apparent from FIG. 12, the determination time period TCHK indicates the deterioration degree of the catalyst, and therefore the correction terms DPR and DPL or the predetermined values TDR and TDL for determining the delay times may be set so as to gradually change with advancement of the deterioration degree (TCHK) of the catalyst.

What is claimed is:

1. An air-fuel ratio control system for an internal combustion engine having an exhaust system, a catalytic converter arranged in said exhaust system, a first air-fuel ratio sensor arranged upstream of said catalytic converter, and a second air-fuel ratio sensor arranged downstream of said catalytic converter, comprising:
   air-fuel ratio control variable-calculating means for calculating an air-fuel ratio control variable, based on an output from said second air-fuel ratio sensor;
   air-fuel ratio correction amount-calculating means for calculating an air-fuel ratio correction amount, based on an output from said first air-fuel ratio sensor and said air-fuel ratio control variable;
   air-fuel ratio control means for controlling an air-fuel ratio of a mixture supplied to said engine, based on said air-fuel ratio correction amount;
   catalytic converter deterioration-detecting means for detecting deterioration of said catalytic converter; and
   enriching correction means for correcting said air-fuel ratio control variable in a rich direction such that the air-fuel ratio of said mixture supplied to said engine becomes richer, when deterioration of said catalytic converter is detected.

2. An air-fuel ratio control system as claimed in claim 1, wherein said air-fuel ratio control variable-calculating means comprises updating means for updating a skip amount which stepwise changes said air-fuel ratio correction amount upon inversion of said output from said first air-fuel ratio sensor, by the use of a first updating amount when said output from said second air-fuel ratio sensor is on a richer side with respect to a predetermined reference value, and by the use of a second updating amount when said output from said second air-fuel ratio sensor is on a leaner side with respect to said predetermined reference value, said enriching correction means comprising updating amount-changing means for changing at least one said first and second updating amounts such that a ratio of said first updatingamount to said second updating amount becomes smaller, when said deterioration of said catalytic converter is detected.

3. An air-fuel ratio control system as claimed in claim 1, wherein said air-fuel ratio correction amount includes a proportional control term, said air-fuel ratio control variable being for correcting said proportional control term.

4. An air-fuel ratio control system for an internal combustion engine having an exhaust system, a catalytic converter arranged in said exhaust system, a first air-fuel ratio sensor arranged upstream of said catalytic converter, and a second air-fuel ratio sensor arranged downstream of said catalytic converter, comprising:

air-fuel ratio control variable-calculating means for calculating an air-fuel ratio control variable, based on an output from said second air-fuel ratio sensor;

delay means for delaying timing of determination as to inversion of an output from said first air-fuel ratio sensor by a first predetermined period of time from a time a first inversion occurs in said output from said first air-fuel ratio sensor, said first inversion being in a direction of change of said output from said first air-fuel ratio sensor from a leaner side to a richer side, and for delaying said timing of determination as to inversion of said output from said first air-fuel ratio sensor by a second predetermined period of time from a time a second inversion occurs in said output from said first air-fuel ratio sensor, said second inversion being in a direction of change of said output from said first air-fuel ratio sensor from the richer side to the leaner side;

air-fuel ratio correction amount-calculating means for calculating an air-fuel ratio correction amount, based on an output from said delay means and said air-fuel ratio control variable;

air-fuel ratio control means for controlling the air-fuel ratio of said mixture supplied to said engine, based on said air-fuel ratio correction amount;

catalytic converter deterioration-detecting means for detecting deterioration of said catalytic converter; and delay time-changing means for changing at least one of said first and second predetermined periods of time such that a ratio of said first predetermined period of time to said second predetermined period of time increases, when deterioration of said catalytic converter is detected.

5. An air-fuel ratio control system as claimed in claim 4, wherein said air-fuel ratio correction amount includes a proportional control term, said air-fuel ratio control variable being for correcting said proportional control term.

* * * * *